Oct. 8, 1935.   A. E. BUELL ET AL   2,016,271
PROCESS FOR DESULPHURIZING HYDROCARBONS
Filed Sept. 10, 1932
FIG. 1.   FRACTIONATED GASOLINE THROUGH BAUXITE
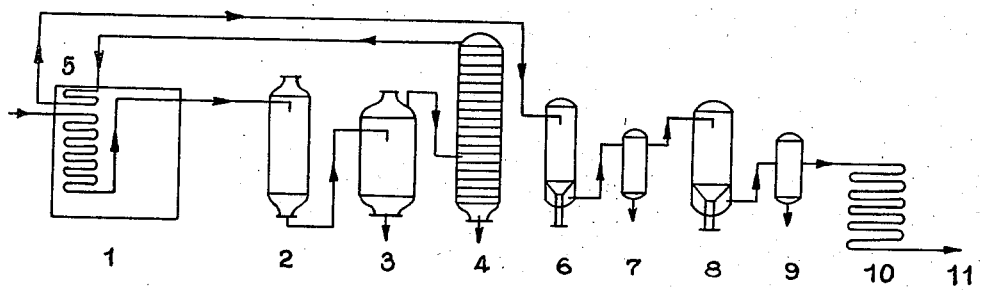
FIG. 2.   FRACTIONATOR AFTER BAUXITE TREATMENT
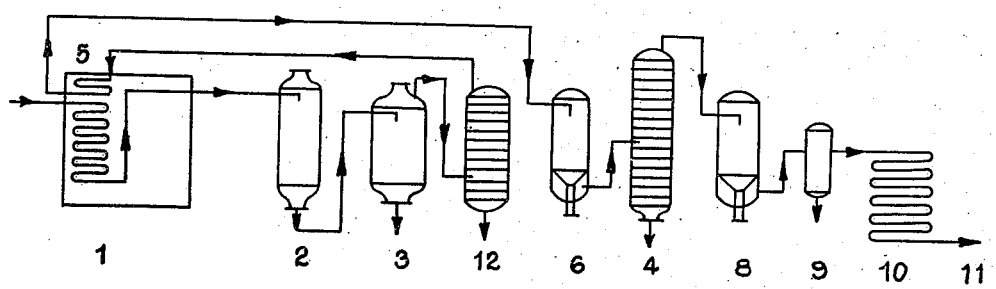
INVENTORS
A. E. BUELL,
W. A. SCHULZE,
BY *Robt. E. Barry*
ATTORNEY Patented Oct. 8, 1935

2,016,271

UNITED STATES PATENT OFFICE 2,016,271

PROCESS FOR DESULPHURIZING HYDROCARBONS

Albert E. Buell and Walter A. Schulze, Bartlesville, Okla., assignors to Phillips Petroleum Company, Bartlesville, Okla., a corporation of Delaware Application September 10, 1932, Serial No. 632,608

6 Claims. (Cl. 196—28)

The present invention is a continuation in part of the copending application, Serial Number 616,574, filed June 10, 1932, for Processes of desulphurizing hydrocarbons, wherein it is shown that certain minerals constitute effective contact agents for the vapor phase desulphurization of hydrocarbons by which a part of the organically combined sulphur is eliminated as hydrogen sulphide.

This invention relates to the application of one of the most suitable of the several mineral contact agents disclosed in the said copending application, namely, bauxite, a mineral essentially composed of hydrated aluminum oxide, to a process of desulphurizing petroleum oils, such as straight run and cracked gasolines, natural gasolines, hydrocarbon gases containing organic sulphur compounds, kerosene, and gasoline stocks or distillates derived from oil shale or from the decomposition of coal, etc.

The invention relates further to a method of reactivating the bauxite after a decrease or loss of activity during use has taken place. It has been found that the bauxite has a greater catalytic activity following its first regeneration than when new, and that this increase in activity is not due to dehydration, since the new bauxite is well dehydrated before it is used, as will hereinafter appear. The bauxite may be subsequently regenerated an indefinite number of times according to the process of the present invention without noticeable decrease in this enhanced catalytic activity. It has further been found that, as a contact agent for the desulphurization of petroleum vapors, the action of this activated bauxite is greatly superior to that of a true adsorbent clay, such as fuller's earth, which is essentially composed of hydrated aluminum silicates.

On the accompanying sheet of drawing is diagrammatically illustrated two cracking systems adapted to be used in one phase of the present invention, namely, the desulphurization of cracked gasoline. Fig. 1 of the said drawing illustrates a system wherein the cracked gasoline is fractionated prior to passage through the bauxite, while Fig. 2 illustrates a system wherein fractionation is effected after the bauxite treatment.

The treatment of straight run gasolines according to the process of the present invention is relatively simple, consisting merely of passing the gasoline vapors, superheated by any convenient means to temperatures between 550 and 750° F., preferably 650° F., through a bed of bauxite crushed to a convenient degree of fineness, say 20–90 mesh to the inch or other mesh grades between these limits, such as 30–60, and contained in a well insulated tower or catalyst chamber.

The flow rate of the gasoline may vary between the limits of 5 to 20 barrels per hour per ton of bauxite, depending upon the original sulphur content of the gasoline and the final content desired. Several thousand barrels may be treated per ton of bauxite before an appreciable loss in activity is incurred. Loss in activity may be denoted by a positive doctor test in the product, but the loss is gradual and substantial sulphur reduction still takes place after the product ceases to be sweet. It is, therefore, optional whether the catalyst is reactivated at the time sweetening ceases or when sufficient sulphur removal no longer takes place. The desulphurized straight run gasoline is then treated by any suitable method for removal of hydrogen sulphide, and sweetened if necessary. Sweetening is unnecessary if (1) the catalyst has not been used too long before reactivation and (2) the flow rate of the gasoline over the catalyst has not been too high.

In this desulphurization process the mercaptans in the gasoline are converted into hydrogen sulphide and the corresponding olefines. As long as the catalyst has a high activity or the gasoline flow rate is not excessive, the mercaptans are so completely converted to hydrogen sulphide that the gasoline gives a negative doctor test on removal of the hydrogen sulphide. This is what is meant by the term "sweet" gasoline in the examples given below. It is possible, however, to obtain a sweet gasoline even when the activity of the catalyst has decreased to the point where a portion of the mercaptans get by undecomposed if the gasoline is given a final caustic wash. The caustic solution, while removing hydrogen sulphide, will also remove these traces of mercaptans which are left in the gasoline and a sweet gasoline will be produced without resorting to one of the usual sweeting methods.

Treatment of cracked gasoline is essentially the same as straight run except that a somewhat higher temperature, 675–700° F., is preferred. Systems which may be used in this treatment are shown, by way of example, diagrammatically on the drawing. Each system comprises essentially a cracking furnace 1, reaction chamber 2, evaporator 3, fractionator 4, superheater coil 5, catalyst chamber 6, cooler 7, clay tower 8, polymer separator 9, condenser 10, outlet 11 to subsequent treating device and (Fig. 2) gas oil separator 12. The several courses taken by the materials being treated will be clear to those skilled in the art from the flow lines shown on the drawing.

The catalyst chamber may be placed in the system, either following the fractionator, Figure 1, or immediately before the fractionator, Figure 2. In the latter case a gas oil separator, 12, is used to effect a partial separation of the gas oil from the gasoline before the vapors are passed over the bauxite. If desired, the vapors can actually be cooled in the separator somewhat below the temperature of the catalytic chamber to insure more complete removal of the heavy ends, and the issuing vapors may then be raised to the desired temperature before passage over the catalyst. Since a partial polymerization of highly unsaturated compounds in the cracked gasoline apparently takes place during the passage over the bauxite, producing a yellow color in the gasoline, the second arrangement mentioned above is particularly advantageous. The fractionating tower, 4, effects a condensation of the higher boiling components of the treated vapors along with the greater part of the colored bodies formed in the catalytic step, this condensate again being charged to the cracking unit, 1. The removal of much of the color from the gasoline in this step makes the final treatment for color and gum much easier. If this latter treatment consists in passing the vapors over an adsorbent clay, such as fuller's earth, the life of the earth will be greatly increased.

In the alternative procedure in which fractionated gasoline is superheated and passed over the bauxite, the vapors leaving the catalyst chamber, 6, may be subjected to any desired treatment for reducing color and gum without further fractionation, if desired, since the end point of the gasoline is not appreciably changed during the desulphurizing treatment.

In either of these procedures the vapors to be passed over the bauxite are heated either in the auxiliary superheater or returned to the furnace and reheated in a superheating coil, 5, to the desired temperature. The catalyst chambers, 6, are preferably provided in duplicate for each unit as is common practice in vapor phase treating, so that one chamber may be reactivated or recharged while the other is in use.

Bauxite, as stated above, is essentially a hydrated aluminum oxide; hence, on heating to elevated temperatures much water is driven off. This water of hydration is not driven off gradually with increasing temperature, such as is the case with hydrated aluminum silicates of the type of fuller's earth, but very rapidly at a threshold temperature somewhere between 392° and 572° F. The following examples are typical for the removal of the water of hydration from several different samples of bauxite in the presence of water vapor under one atmosphere pressure. A sample of a typical adsorbent clay of the hydrosilicate type is included for comparative purposes.

as the temperature is sufficiently high to prevent undue condensation of the vapors in the catalyst chamber.

It has been found that the bauxite gradually loses its catalytic activity with use and that this decrease is considerably more marked when cracked gasoline is passed over it than when straight run gasoline is treated. Therefore, a satisfactory method of regeneration of the bauxite is extremely important economically when the desulphurization of cracked gasolines and distillates is undertaken.

The present invention comprehends a simple method of regeneration which may more aptly be termed an activation, since the activity of the bauxite following the first regeneration according to the invention is considerably greater than that of the new material and the life is much longer.

The reactivation process consists in first steaming out the residual hydrocarbon vapors and then passing air and steam simultaneously through the catalytic material. A temperature of 775-850° F. is preferred but it is possible to use both lower and higher temperatures depending on the nature of the carbonaceous materials which are to be removed. For example, we have been able to completely remove these objectionable bodies from some samples of bauxite at temperatures not exceeding 660° F. But in general, in order to obtain regeneration in a minimum time temperatures of the order of 775-850° F. are preferred. The reactivation may also be accomplished by first steaming the catalyst and subsequently passing air over it, instead of using steam and air simultaneously as indicated above or, as far as reactivation alone is concerned, the steaming may be omitted altogether in certain cases. It has been found, too, that the catalyst can be partially regenerated with steam alone and its life somewhat extended in some cases, but since the full activity can be restored by such a simple method as described above, it is obviously desirable in most cases to use both steam and air.

Usually the quantity of carbonaceous matter in the reaction chamber is not large and the heat developed in the oxidation can be readily carried away. In cases where over-heating is likely to develop, flue gas can be substituted wholly or in part for the air at least in the preliminary stages of the regeneration, and the temperature of the ingoing gases can be regulated as well to obtain proper regeneration.

The bauxite can be regenerated without removal from the reaction chamber by heating the

| Description of sample | Percent of loss in weight of sample at | | | | | |
|---|---|---|---|---|---|---|
| | 122° F. | 212° F. | 392° F. | 572° F. | 752° F. | 932° F. |
| 1 Arkansas bauxite #1 | 0.285 | 0.457 | 1.01 | 22.35 | 28.70 | 30.08 |
| 2 Arkansas bauxite #2 | 0.482 | 0.756 | 1.17 | 17.99 | 22.00 | 23.29 |
| 3 Arkansas bauxite #3 | 0.495 | 1.07 | 1.87 | 21.48 | 26.16 | 27.15 |
| 4 Alabama bauxite #1 | 0.492 | 1.25 | 1.90 | 18.31 | 21.92 | 22.98 |
| 5 Olmstead fuller's earth | 0.449 | 2.60 | 6.34 | 7.22 | 7.94 | 8.69 |

Therefore, in practicing this desulphurization process the first step usually preferred consists in dehydrating the bauxite, preferably in situ, by raising the temperature gradually to approximately 752° F., while a slow stream of air or hydrocarbon gas is passed over it. This step of passing air or hydrocarbon gas over the bauxite can obviously be omitted, if desired, and the gasoline vapors started over the bauxite as soon ingoing air and steam to the necessary temperature or it can be removed to a separate furnace for regeneration.

The bauxite, whether new or reactivated, gradually loses its activity during use and, as mentioned before, the decrease is more rapid when unsaturated hydrocarbons are present in the vapors passed over the catalyst. The desulphurization of the gasoline vapors, however, is so complete with respect to mercaptans when the bauxite is not poisoned with impurities that a negative doctor test is obtained after the hydrogen sulphide is removed. Experiments on Panhandle straight run gasoline show that the first 2,000 barrels of gasoline per ton of bauxite can be obtained sweet to the doctor test. Also, the tests on Panhandle cracked gasoline show that at least 500 to 800 barrels of gasoline per ton of bauxite can be obtained sweet to the doctor test. If the catalyst is then regenerated, it is possible to obtain sweet gasoline indefinitely.

Since the catalytic material gradually loses its activity with use, this decrease in activity can be compensated for in practice by either increasing the temperature or by decreasing the rate of flow of the gasoline vapors over the material during the desulphurizing cycle. For example, a sweet product may be obtained at a low temperature when the bauxite is freshly activated but a higher temperature will be necessary in order to get a completely sweet product at the same flow rate when the catalyst is old. Decreasing the rate at the lower temperature will produce a sweet gasoline wherein the higher rate would have produced a sour product. In practice the temperature can be more easily changed than the flow rate. In this connection it should be mentioned that low temperatures are preferable since less colored material is formed.

In this desulphurization with bauxite very little of the hydrogen sulphide is actually held by the catalyst. A little hydrogen sulphide will be given off with the first two liquid volume equivalents of gasoline passed over a freshly activated catalyst and much hydrogen sulphide will be present in the first four or five volume equivalents, although the original gasoline vapors contained not a trace of hydrogen sulphide. In this connection bauxite differs considerably from adsorbent clays like fuller's earth. A sample of Olmstead fuller's earth under similar conditions was found to take up all the hydrogen sulphide until more than 15 liquid volume equivalents of gasoline had been passed over it, and very little hydrogen sulphide was present even in the first 25 volumes.

The following specific examples are given as illustrative of the results which have been obtained on desulphurizing cracked gasoline, but in no sense limit the invention.

*Example 1*

Gasoline (produced by pressure cracking of Panhandle crude) with sulphur content of 0.156% after removal of hydrogen sulphide was passed over reactivated Arkansas bauxite at a flow rate of 6.1 barrels of gasoline per hour per ton of bauxite (weight taken on the basis of new material before dehydration). The temperature ranged from 620° F. at the beginning to a maximum value of 700° F. The following results were obtained:

| Barrels of gasoline per ton of bauxite | Sulphur content after removal of $H_2S$ | Doctor test |
|---|---|---|
| 0- 97 | 0.087% | Sweet. |
| 97-151 | 0.093% | Do. |
| 151-243 | 0.092% | Do. |
| 243-297 | Not determined. | Do. |
| 297-386 | 0.097% | Do. |
| 386-443 | Not determined. | Do. |
| 443-532 | 0.101% | Do. |
| 532-554 | Not determined. | Very faintly sour. |

These results show that even though a gradual increase in sulphur content is obtained the gasoline remained sweet to doctor until more than 500 barrels of gasoline per ton of bauxite had been desulphurized. The average sulphur reduction was approximately 41.7% based on the original sulphur content of 0.156%.

*Example 2*

As stated above, the reactivated bauxite is a more efficient catalyst for desulphurization than the new material previously dehydrated. A sample of new Arkansas bauxite #3 was dehydrated up to 842° F. while a slow stream of hydrogen gas was passed over it. Gasoline, produced by cracking, with 0.183 per cent sulphur content (hydrogen sulphide free) was then passed in the vapor phase over this catalyst. The furnace was not equipped with a temperature control so the temperature varied with the line voltage. The flow rates are calculated on barrels of gasoline per hour per ton of new bauxite before dehydration.

| Barrels of gasoline per ton of bauxite | Flow rate | Minimum and maximum temperature in degrees, Fahrenheit | Sulphur content after removal of $H_2S$ | Doctor test |
|---|---|---|---|---|
| 0- 33 | 6.8 | 657-671 | 0.114% | Sweet. |
| 33-128 | 6.1 | 657-734 | 0.117 | Slightly sour. |
| 128-214 | 6.0 | 657-698 | 0.123 | Sour. |
| 214-266 | 5.5 | 684-689 | 0.124 | Do. |

The average sulphur reduction was 34.5% based on the original content of 0.183%.

The above sample of bauxite was then regenerated by the method described above and the following results were then obtained on the same gasoline.

| Barrels of gasoline per ton of bauxite | Flow rate | Minimum and maximum temperature in degrees, Fahrenheit | Sulphur content after removal of $H_2S$ | Doctor test |
|---|---|---|---|---|
| 0- 20 | 6.0 | 608-630 | Not determined. | Sweet. |
| 20-118 | 6.4 | 630-667 | 0.106 | Do. |
| 118-172 | 6.75 | 648-667 | 0.116 | Do. |
| 172-277 | 6.0 | 648-684 | 0.117 | Do. |
| 277-298 | 7.4 | 662-684 | 0.116 | Do. |

The average sulphur reduction was 37.4%. All of the gasoline was sweet to the doctor test, although the average working temperature was considerably under that used with the new bauxite.

*Example 3*

This example shows (1) that the mineral bauxite is a more efficient desulphurization catalyst than the hydrated aluminum silicates of which fuller's earth is an example, (2) that following regeneration of both bauxite and fuller's earth the margin of superiority of the bauxite over that of the fuller's earth is greatly increased, and (3) that the bauxite has a greater activity after reactivation than when new, i. e., a larger sulphur reduction is obtained with the result that a completely sweetened gasoline is produced over a long period.

Equal weights of new Arkansas bauxite #3 and new Olmstead fuller's earth were placed in tubes side by side in a furnace so that the temperatures of both would be exactly the same at all times during the run, thus eliminating the effect of fluctuations in furnace temperature. The flow rates in barrels of gasoline per hour per ton of catalyst (hydrated form) were approximately the same at all times but the actual contact time of the vapors was considerably longer in the case of the fuller's earth because of its lower specific gravity and, hence, greater volume. If equal volumes instead of equal weights of the catalysts had been used the superiority of the bauxite would have been greatly increased over that shown in this example.

A sample of Panhandle cracked gasoline with sulphur content of 0.132% after removal of hydrogen sulphide was used for these tests, the results of which are given below:

*New Arkansas bauxite #3*

| Barrels of gasoline per ton of catalyst | Flow rate | Approximate mean temperature in degrees Fahrenheit | Sulphur content after bauxite | Doctor test |
|---|---|---|---|---|
| 0- 32 | 9.1 | 655 | 0.084 | Sweet. |
| 32- 58 | 6.1 | 645 | 0.086 | Do. |
| 58-132 | 6.0 | 645 | 0.090 | Slightly sour. |
| 132-189 | 6.2 | 650 | 0.095 | Do. |
| 189-274 | 6.1 | 680 | 0.095 | Sour. |
| 274-353 | 6.1 | 685 | 0.094 | Do. |
| 353-417 | 5.9 | 690 | 0.093 | Do. |
| 417-500 | 5.9 | 705 | 0.093 | Do. |
| 500-559 | 5.9 | 715 | 0.097 | Do. |
| 559-636 | 5.7 | 725 | 0.095 | Do. |
| 636-697 | 5.8 | 725 | 0.099 | Do. |
| 697-780 | 5.7 | 690 | 0.106 | Do. |
| 780-874 | 5.7 | 710 | 0.105 | Do. |
| 874-974 | 5.9 | 710 | 0.110 | Do. |

*New Olmstead fuller's earth*

| Barrels of gasoline per ton of catalyst | Flow rate | Approximate mean temperature in degrees Fahrenheit | Sulphur content after fuller's earth | Doctor test |
|---|---|---|---|---|
| 0- 25 | 7.1 | 655 | 0.085 | Sweet. |
| 25- 51 | 6.1 | 645 | 0.093 | Do. |
| 51-125 | 6.0 | 645 | 0.095 | Do. |
| 125-182 | 6.2 | 650 | 0.101 | Slightly sour. |
| 182-266 | 6.1 | 680 | 0.100 | Do. |
| 266-345 | 6.1 | 685 | 0.102 | Sour. |
| 345-409 | 5.9 | 690 | 0.102 | Do. |
| 409-492 | 5.9 | 705 | 0.098 | Do. |
| 492-551 | 5.9 | 715 | 0.104 | Do. |
| 551-622 | 5.3 | 725 | 0.102 | Do. |
| 622-686 | 6.0 | 725 | 0.105 | Do. |
| 686-769 | 5.7 | 690 | 0.110 | Do. |
| 769-855 | 5.2 | 710 | 0.110 | Do. |
| 855-952 | 5.7 | 710 | 0.116 | Do. |

These catalysts were then regenerated by the method described above and the following results obtained.

*Reactivated Arkansas bauxite #3*

| Barrels of gasoline per ton of catalyst | Flow rate | Approximate mean temperature in degrees Fahrenheit | Sulphur content after bauxite | Doctor test |
|---|---|---|---|---|
| 0- 12 | 5.1 | 606 | 0.077 | Sweet. |
| 12- 86 | 6.0 | 617 | 0.084 | Do. |
| 86-148 | 5.8 | 630 | 0.086 | Do. |
| 148-218 | 5.6 | 644 | 0.090 | Do. |
| 218-288 | 5.7 | 640 | 0.091 | Do. |
| 288-351 | 5.7 | 620 | 0.097 | Faintly sour. |
| 351-425 | 5.6 | 655 | 0.095 | Do. |
| 425-488 | 5.7 | 662 | 0.094 | Very faintly sour. |
| 488-543 | 5.8 | 665 | 0.094 | Slightly sour. |
| 543-624 | 5.6 | 710 | 0.091 | Sweet. |
| 624-696 | 5.8 | 700 | 0.092 | Do. |
| 696-763 | 5.6 | 720 | 0.089 | Do. |
| 763-804 | 5.6 | 720 | 0.091 | Do. |
| 804-891 | 5.5 | 730 | 0.092 | Do. |
| 891-947 | 5.6 | 730 | 0.096 | Very slightly sour. |

*Reactivated Olmstead fuller's earth*

| Barrels of gasoline per ton of catalyst | Flow rate | Approximate mean temperature in degrees Fahrenheit | Sulphur content after fuller's earth | Doctor test |
|---|---|---|---|---|
| 0- 12 | 5.1 | 606 | 0.105 | Sweet. |
| 12- 77 | 5.3 | 617 | 0.099 | Do. |
| 77-134 | 5.3 | 630 | 0.102 | Do. |
| 134-200 | 5.4 | 644 | 0.101 | Slightly sour. |
| 200-269 | 5.5 | 640 | 0.104 | Sour. |
| 269-333 | 5.8 | 620 | 0.109 | Do. |
| 333-408 | 5.7 | 655 | 0.106 | Do. |
| 408-471 | 5.7 | 662 | 0.106 | Do. |
| 471-526 | 5.8 | 665 | 0.104 | Do. |
| 526-608 | 5.7 | 710 | 0.101 | Do. |
| 608-674 | 5.3 | 700 | 0.103 | Do. |
| 674-751 | 6.4 | 720 | 0.103 | Do. |
| 751-794 | 5.9 | 720 | 0.099 | Do. |
| 794-884 | 5.6 | 730 | 0.099 | Do. |
| 884-939 | 5.5 | 730 | 0.105 | Do. |

The average sulphur reductions based on the original sulphur content of 0.132% were:

| | Per cent |
|---|---|
| New bauxite | 25.8 |
| Regenerated bauxite | 30.6 |
| New fuller's earth | 21.7 |
| Regenerated fuller's earth | 22.1 |

It should be noted that the reactivated bauxite gave a completely sweetened gasoline far longer than the new bauxite and the fuller's earth gave very little sweet gasoline in either case.

Having described the invention, what is claimed is:

1. The method of sweetening mercaptan-bearing petroleum oil with a boiling point lower than the end point of kerosene, comprising vaporizing the oil, superheating the resultant vapors to a temperature within the range from 606° to 750° F., passing the superheated vapors, without substantial cooling, through a bed of crushed bauxite catalyst at a flow rate of about 8 to 20 barrels of oil per hour per ton of catalyst, whereby the mercaptans are converted into hydrogen sulphide, cooling and condensing the vapors, and removing the hydrogen sulphide, whereby a sweetened oil is obtained.

2. The method of sweetening mercaptan-bearing petroleum oil with a boiling point lower than the end point of kerosene, comprising vaporizing the oil, superheating the resultant vapors to a temperature within the range from 606° to 750° F., contacting the superheated vapors, without substantial cooling, with raw dehydrated bauxite for a period of about 2 to 10 seconds, whereby the mercaptans are converted into hydrogen sulphide, cooling and condensing the vapors, and removing the hydrogen sulphide, whereby a sweetened oil is obtained.

3. The process of sweetening gasoline containing impurities of the mercaptan sulphur type, comprising vaporizing the gasoline, superheating the vapors to a temperature within the range from 606° to 750° F., contacting the superheated vapors at approximately the same temperature with a bauxite catalyst for a period of about 2 to 10 seconds, separating the resultant decomposed sulphur impurities, and collecting the gasoline sweetened thereby.

4. The method of sweetening mercaptan-bearing petroleum oil, comprising vaporizing the oil with a boiling point lower than the end point of kerosene, superheating the resultant vapors to a temperature within the range from 606° to 750° F., contacting the superheated vapors, without substantial cooling with an activated bauxite catalyst for a period of about 2 to 10 seconds, whereby the mercaptans are converted into hydrogen sulphide, cooling and condensing the vapors, and removing the hydrogen sulphide, whereby a sweetened oil is obtained.

5. A cyclic process of sweetening petroleum oil with a boiling point lower than the end point of kerosene, containing impurities of the mercaptan sulphur type, comprising vaporizing the petroleum oil, superheating the vapors to a temperature within the range from 606° to 750° F., contacting the superheated vapors at approximately the same temperature with a bauxite catalyst for a period of about 2 to 10 seconds, separating the resultant decomposed sulphur impurities, collecting the petroleum oil sweetened thereby, discontinuing said contacting when a sweet oil is no longer obtained, reactivating the catalyst, and repeating the process.

6. A cyclic process of sweetening gasoline containing impurities of the mercaptan sulphur type, comprising vaporizing the gasoline, superheating the vapors to a temperature within the range from 606° to 750° F., contacting the superheated vapors at approximately the same temperature with a bauxite catalyst for a period of about 2 to 10 seconds, separating the resultant decomposed sulphur impurities, collecting the gasoline sweetened thereby, discontinuing said contacting when a sweet gasoline is no longer obtained, reactivating the catalyst, and repeating the process.

ALBERT E. BUELL.
WALTER A. SCHULZE.